US005165574A

United States Patent [19]

Ratcliffe

[11] Patent Number: 5,165,574

[45] Date of Patent: Nov. 24, 1992

[54] DRIP BUCKET

[75] Inventor: Ralph D. Ratcliffe, Mississauga, Canada

[73] Assignee: Preventative Maintenance Systems Ltd., Oakville, Canada

[21] Appl. No.: 775,316

[22] Filed: Oct. 15, 1991

[51] Int. Cl.[5] .......................... B67D 1/16; F16K 23/00

[52] U.S. Cl. ........................................ 222/108; 141/87; 141/383; 137/313

[58] Field of Search ................................ 222/108-111, 222/571; 141/86, 87, 88, 364, 383; 137/312, 313, 314

[56] References Cited

U.S. PATENT DOCUMENTS

| | | | |
|---|---|---|---|
| 2,087,139 | 7/1937 | Cameron | 222/108 X |
| 3,451,445 | 6/1969 | Sippola | 222/108 X |
| 3,604,478 | 9/1971 | Gowens | 141/383 X |
| 4,817,691 | 4/1989 | Lau | 141/86 X |

FOREIGN PATENT DOCUMENTS

| | | | |
|---|---|---|---|
| 2611688 | 9/1988 | France | 222/108 |

*Primary Examiner*—Andres Kashnikow
*Assistant Examiner*—Kenneth DeRosa
*Attorney, Agent, or Firm*—Donald E. Hewson

[57] ABSTRACT

A drip cup for catching fluid dripping from the end of a spout is disclosed. The drip cup clamps securely on to the end of the spout. A spring biased clamping pin passes through the wall of the cup and contacts the spout contained within the drip cup. The spout is clamped between the end of the clamping pin and the opposed part of the inner wall of the drip cup. There is a hand manipulated actuator located near the handle of the drip cup that is grasped by a person's hand in order to move the clamping pin and thereby facilitate clamping and releasing of the spout.

9 Claims, 3 Drawing Sheets

DRIP BUCKET

FIELD OF THE INVENTION

This invention relates to vessels for containing liquids and more particularly to small cup shaped vessels for containing small amounts of liquid. Specifically, cup shaped vessels used to contain the dripping of fluids from the end of a loading arm, such as those used to convey fuels and liquid chemicals such as petroleum and petrochemical based products, are discussed.

BACKGROUND OF THE INVENTION

In the petroleum industry, the petrochemical industry, and in the chemical industry in general, liquid products are transported from containers of various types to other containers via hoses and loading arms. Such liquids may include oil, gasoline, acids, alkaline solutions, asphalt, herbicides, and so on. These liquids may be highly flammable or corrosive, and may also be liquids or semi-liquids (highly viscous liquids). The containers that receive the liquid fuel and chemical products may be stationary such as holding tanks, or mobile such as tanker trucks and rail cars. Generally, most of the transferring operations consist of transferring liquid oils, fuels and chemical products from a refinery to a tanker truck, or similar, and then from the tanker truck to an outlet—such as a gasoline station in the case of petroleum products. For the purposes of discussion, the petroleum industry will generally be referred to. The technology is applicable, however, to virtually any chemical industry.

The loaders that are used are usually permanently attached to a platform and piped from storage tanks. The fuels and chemicals are then pumped from the storage tanks to the vessels transporting the products for further distribution. There is an elongated metal spout or hose on the free end of each loader for interfacing with the container that is receiving the liquid products.

More specifically, a loading arm delivering product from a holding tank at a refinery has a spout on the end thereof, with the spout being adapted for insertion into a co-operating receiving portion on a tanker truck. When not in use, the spout remains elevated and oriented such that the opening of the spout is downwardly directed. The spout is placed into the co-operating receiving portion and a handle or the like on the spout is activated. Activation of this handle opens a co-operating valve that controls the release of liquid fuels, oils and chemical products through the spout. The liquid petroleum products are released into the tanker truck. In order to stop the transfer of liquid petroleum products through the spout the handle is deactivated, usually by releasing it, and the co-operating valve closes.

There is one problem, however, in that a small amount of the liquid petroleum product remains in the spout below the level of the valve, after the valve is closed. This small amount of liquid petroleum product generally remains on the inner surfaces of the spout by adhesion or surface tension; and because the spout is oriented such that the opening in the spout is downwardly directed the small amount of the liquid petroleum product drips out of the spout over a period of time. Obviously, either this dripping liquid petroleum product ends up either on whatever is directly underneath, whether it be the ground, asphalt, cement, gravel, or whatever. If the surface is not asphalt, cement, or similar, the petroleum product would seep into the water table. In order to preclude the petroleum product from reach the ground area, it must be captured in some sort of container.

Such a container must be highly resistant to liquid petroleum products, it must be sturdy enough to withstand a rugged environment—both in terms of weather and rough physical use—and it also must clamp tightly onto a spout such that it does not fall off the spout and preferably such that it does not move significantly while on the spout. It has been found that such movement of a drip cup on a spout can be undesirably noisy and also can cause damage to the spout. Preferably, a drip cup would attach to the end of a spout in a snug and secure manner such that undue movement between the two is precluded.

SUMMARY OF THE INVENTION

The invention disclosed herein provides a drip cup that is used to catch fluid dripping from the end of a spout. The drip cup is removably attached to the spout with the spout being oriented in a downwardly extending manner and the drip cup fitting over the end thereof and being oriented in an upright manner. The drip cup is removably attached and is held onto the spout by a spring biased clamping means, in particular a clamping pin. The spout is clamped between the clamping pin and the interior of the drip cup opposite the clamping pin.

Typically, such a spout is located on the end of the loading arm that is used to transfer liquid from one container into another. Alternatively, the spout may be placed on the end of a tube, or similar, that is again used to transfer liquid from one container to another.

An apparatus adapted for placement on the end of a spout to catch liquid dripping from the spout, is disclosed.

The drip cup of the present invention comprises a vessel for containing the dripped liquid. The vessel has an interior adapted to receive and retain a volume of liquid, and also an opening into the interior at the top of said vessel for receiving the spout. The vessel is generally elongated and has a central axis directed lengthwise within the vessel. There is also a handle attached to the vessel to allow for carrying and manipulation of the vessel by one hand, and a clamping means associated with the handle, with the clamping means being located generally externally to the vessel, the clamping means comprising a clamping pin, a hand manipulated actuator, and a biasing means. The handle aids in the manipulation of the actuator. The clamping pin is attached to the actuator and moves in conjunction therewith and extends from the actuator to the interior of the vessel. The clamping pin and the actuator have a clamp position and a release position, and the biasing means biases the clamping pin and the actuator to the clamp position in order to retain the spout.

In the drip cup of the present invention, the spring is held in within a protective housing and cannot escape. The clamping pin has a washer, or similar, rigidly attached to it so that it compresses the spring when the hand manipulated actuator is squeezed toward the handle. Because of the washer, the pin is held permanently within the protective housing. Further the protective housing protects the spring, washer, and the clamping pin from being damaged.

In use, the clamping pin is biased against the spout and is generally perpendicularly thereto, such that all of the clamping force provided by the spring is therefore also directed generally perpendicularly against the spout. In this manner, the drip cup of the present invention clamps onto a spout as tightly as possible for a given amount of compression of the biasing spring. Further, a spout having a diameter that is significantly smaller than the diameter of the vessel of the drip cup can be properly clamped. In general, when the spout is vertically oriented in a manner that the liquid drips therefrom, the pin is horizontally disposed.

BRIEF DESCRIPTION OF THE DRAWINGS

Embodiments of this invention will now be described by way of example in association with the accompanying drawings in which.

PRIOR ART

Figure 1:
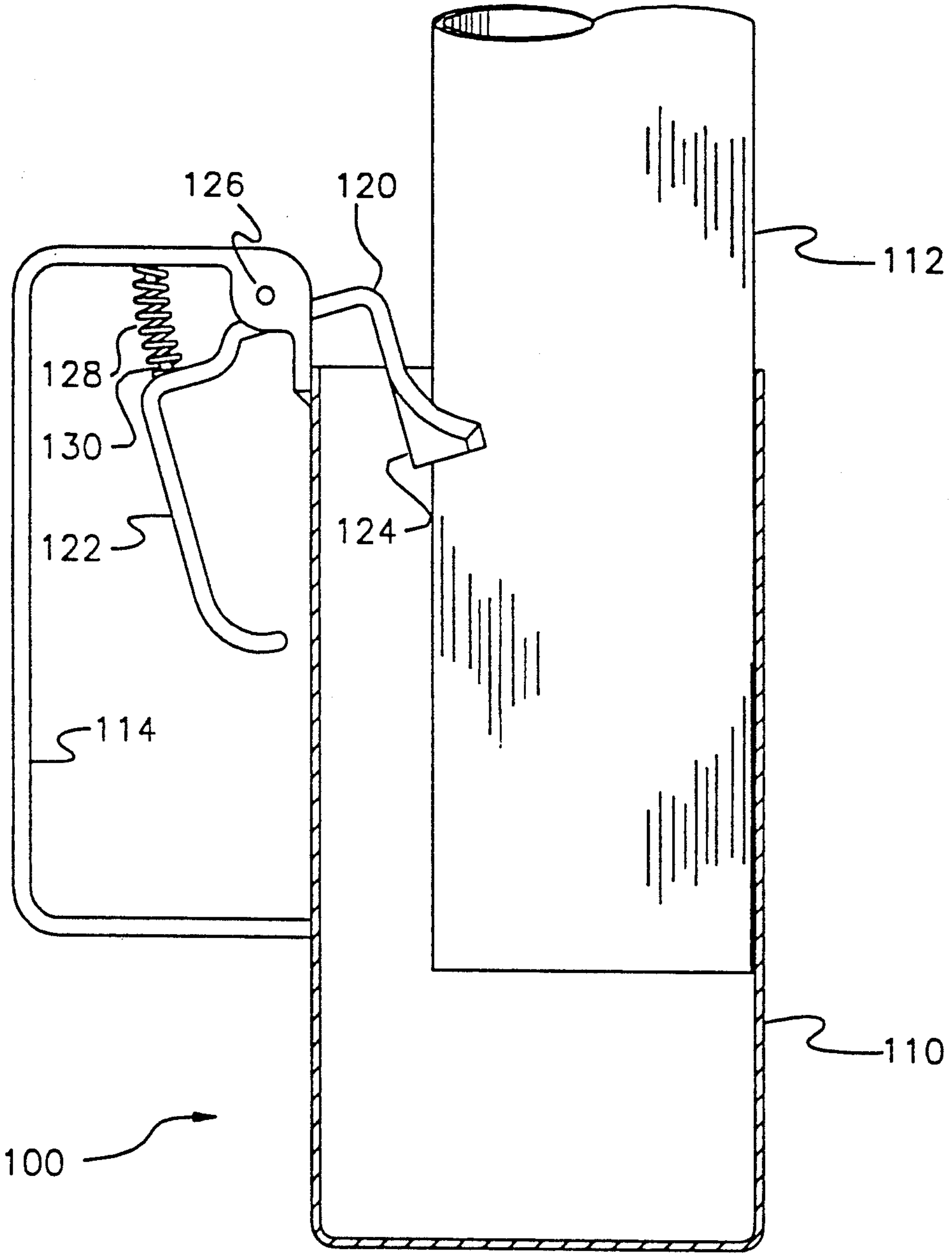
FIG. 1 PRIOR ART
FIG. 1 is a cross-sectional view of a prior art drip cup.

The most closely related prior art is a drip cup that is produced by Emco Wheaton, as shown in FIG. 1 and labeled Prior Art. This drip cup 100 comprises a vessel 110 that is used to catch drips of petrochemical product, or other liquid being dispensed, from a spout 112. It also has a handle 114 rigidly attached to the vessel 110 for manipulation and carrying of the drip cup. There is also a spring biased clamping member 120 that has an outer portion 122 at the exterior of the vessel and in the vicinity of the handle, and in inner portion 124 that extends into the interior of the vessel. The clamping member is rotatably attached at 126, in the area where the handle interfaces with the top of the vessel. The clamping member is spring biased such that the outer portion 122 of the clamping member is pushed away from the handle 114 and towards the exterior of the vessel 110, and the inner portion 124 of the clamping member is pushed inwardly toward the central area of the vessel 110. The biasing member, which is a simple spring 128 in compression, actually pushes downwardly on a shoulder 130 of the outer portion 122 of the clamping member.

There are a number of disadvantages to the design of this prior art device. The first disadvantage is that the outer portion 122 of the clamping member 120 travels in a curved path, which in turn means that the biasing spring 128 is curved when it is extended. Since the biasing spring 128 is held on only by placement over one lug at each end thereof, it is relatively easy to remove the biased spring—even unwantedly—from between the handle 114 and the clamping member 120.

It can be seen that the inner portion of the clamping member travels upwardly as well as inwardly as it is about to clamp a spout 112 within the vessel 110. This means that not all of the clamping force is being directed perpendicularly towards the spout 112, which is what is desired. Further, since the inner portion of the clamping member 120 also travels in an arc, there is a lower limit to the size of spout 112 that can be properly accommodated.

Finally, the biasing spring 128 is not internally contained but is exposed to the ambient surroudings, and is therefore more prone to be dislodged, damaged, and so on. Replacement of such a biasing spring in the field, without proper equipment, can be quite difficult.

DETAILED DESCRIPTION OF THE PREFERRED EMBODIMENTS

Figure 2:
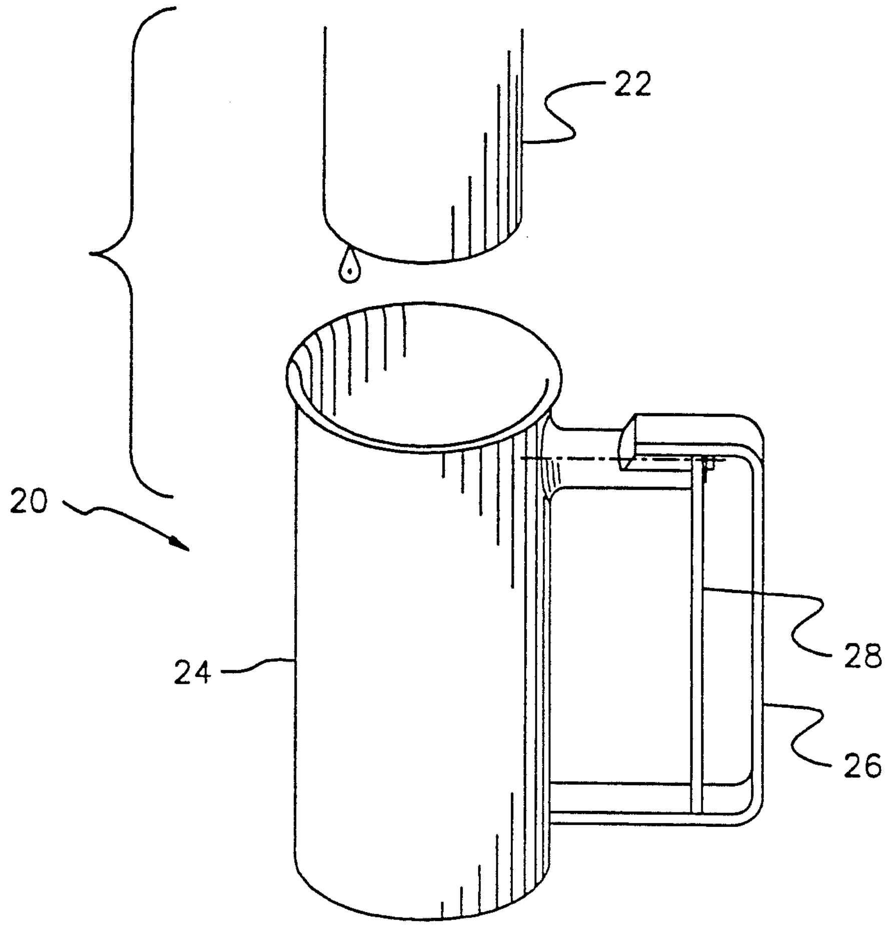
FIG. 2 is a perspective view of the drip cup of the present invention.

Reference will now be made to FIG. 2, which shows the drip cup 20 of the present invention oriented in an upright position and about to be placed onto the end of a spout 22. The spout 22 has been used to dispense liquid, typically a petroleum based derivative or as discussed above; and a residual amount of the dispensed liquid remains adhered to the inner surfaces of the spout after dispensing is complete. It can be seen that this liquid slowly drips from the spout 22. If it is not caught and contained by some sort of apparatus, it will fall to the ground, which is typically an asphalt or cement surface, or gravel. The surface would typically either be stained or damaged by such liquid or where gravel is used, the products could seep into the water table.

The drip cup 20 comprises a vessel 24 for containing liquid therein, and a handle 26 to allow for carrying and manipulation of the drip cup. Associated with the handle 26 is a hand manipulated actuator 28. The handle 26 and the hand manipulated actuator 28 can be gripped by one hand or by two hands. Operation of the hand manipulated actuator 28 will be discussed hereafter, with reference to FIGS. 2 and 3.

In order to place the drip cup 20 onto the spout 22 so that it is retained thereon, the drip cup 20 is grasped around the handle 26 and the hand manipulated actuator 28, which are squeezed together such that the hand manipulated actuator 28 moves with respect to the handle 26. The drip cup 20 can then be slid onto the spout 22. The hand manipulated actuator 28 is then released so that the drip cup 20 will become clamped to the spout 22.

Figure 4:
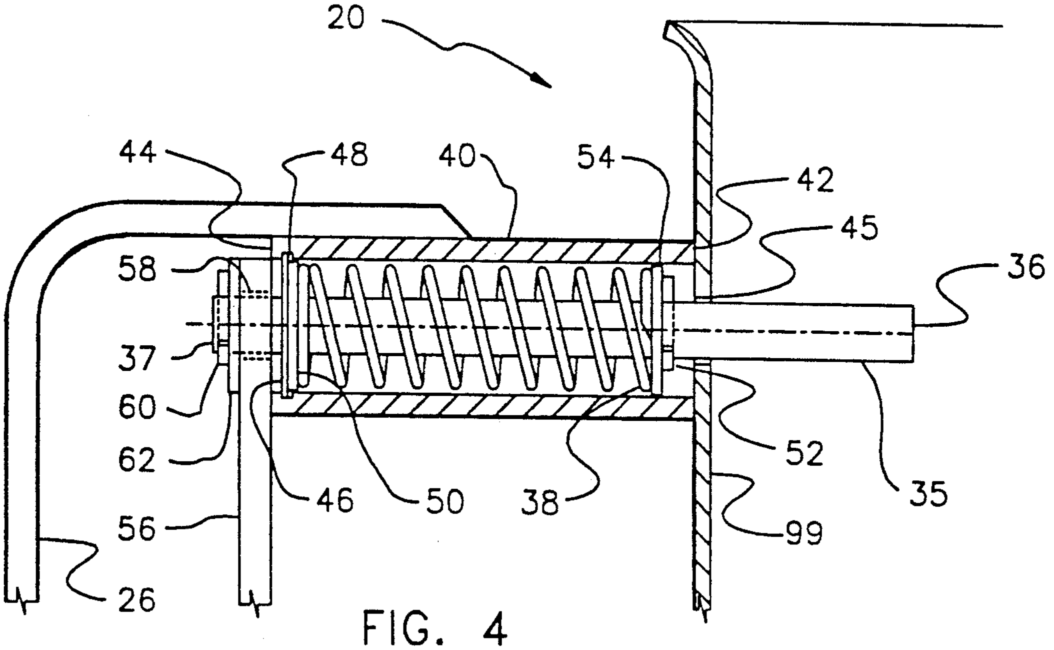
FIG. 4 is an enlarged view of a portion of the drip cup as shown in FIG. 3.
Figure 3:
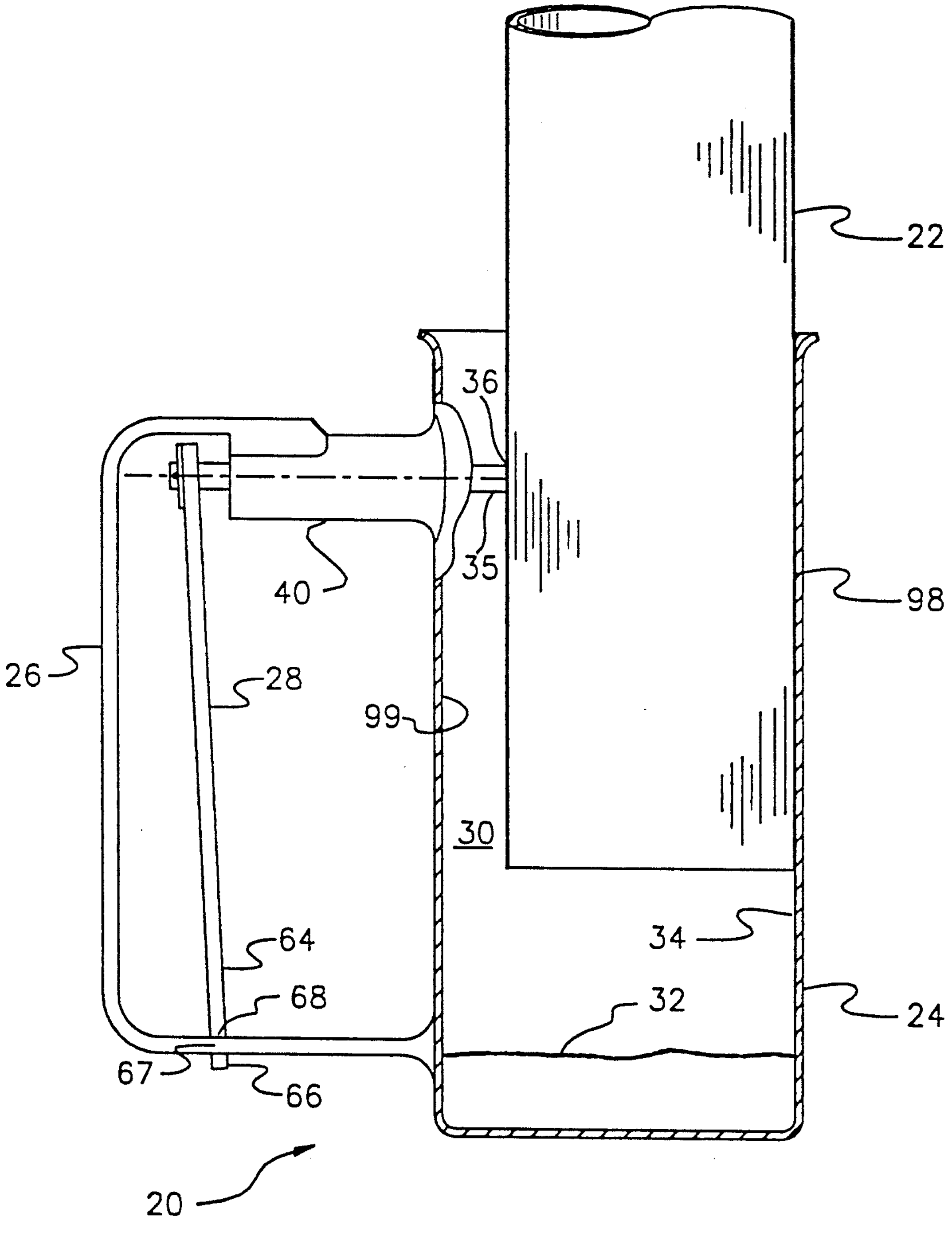
FIG. 3 is a partially cut away view of the drip cup of the present invention.

Reference will now be made to FIGS. 3 and 4. FIG. 3 shows the drip cup 20 of the present invention in place over a spout 22, with the drip cup 20 being clamped thereto; and FIG. 4 is a more detailed showing of the clamping arrangement of the present invention. It can be seen that the drip cup 20 has an interior 30 that receives and retains the spout 22 and also receives drips of liquid from the spout 22 and retains this liquid as a volume of liquid 32 therein. This volume of liquid can be emptied into the container that is next being filled from the spout 22.

The spout 22 is clamped between a first portion 98 of the inner surface 34 of the vessel 24 on one side thereof and on the opposed side thereof by the first end 36 of the clamping pin 35. The clamping pin 35 also has a second end 37 at the opposite end thereof, as shown in FIG. 4. The clamping pin 35 is biased toward the spout 22 by a biasing means which in the preferred embodiment is spring 38. The spring 38 and a large portion of the clamping pin 35 are housed within protective housing 40, which has a first end 42 and a second end 44. The protective housing 40 is preferably welded to the vessel 24 at its first end 42 around a small opening 45. The clamping pin 35 extends through the opening 42 into the interior 30 of the vessel 24. The handle 26 is connected at its top portion to the second end 44 of the protective housing 40. The spring 38 is retained within the protective housing 40 at the second end 44 by a stop ring 46. The stop ring 46 is removably seated in an annular groove 48 within the protective housing 40. Typically, a washer 50 interfaces between the stop ring 46 and the end of the spring 38. The spring 38 is held in the protective housing 40 at the first end 42 by a cotter pin 52 that is located through a hole in the clamping pin 35. A washer 54 interfaces between the spring 38 and the cotter pin 52.

External to the second end 44 of the protective housing 40 is the top end 56 of the hand manipulated actuator 28. The clamping pin 35 passes through an opening 58 in the top end 56 of the hand manipulated actuator 28. The hand manipulated actuator 28 is held in place on the clamping pin 35 at or near the second end 37 thereof by a cotter pin 60, with a washer 62 interfacing therebetween.

In order for the drip cup 20 to receive a spout 22, a person would place one or two hands around the handle 26 and the hand manipulated actuator 28 and would squeeze the two of them together. The hand manipulated actuator 28 would resultingly move away from the second end 44 of the protective housing 40 and in turn would push on the washer 62. The washer 62 in turn pushes on the cotter pin 60, which moves the clamping pin 35 towards the second end 44 of the protective housing 40. Resultingly, the first end 36 of the clamping pin 35 is moved toward a second portion 99 of the inner surface 34 of the vessel 24. This movement is resisted by spring 38, which is in compression. The spring 38 pushes on the washer 54 which in turn pushes on the cotter pin 52 which in turn pushes the clamping pin 35 toward the interior of the vessel 24.

After the spout 22 has been inserted into the vessel 24, the hand manipulated actuator 28 can be released. The spring 38 would then cause the clamping pin 35 to contact the spout 22 and force it against the first portion 98 of the inner surface 34 of the vessel 24. In this way, the spout 22 is trapped by the drip cup 20 —or conversely the drip cup 20 is clamped onto the spout 22. The drip cup 20 can of course be released from the spout 22 by again squeezing the hand manipulated actuator 28 towards the handle 26 until the clamping pin 35 no longer traps the spout 22 against the inner surface 34.

The hand manipulated actuator 28 has a bottom end 64 that extends into a narrow portion 66 that is inserted into an orifice in the hand 26 such that the shoulder 68 of the hand manipulated actuator 28 rests on the top surface of the handle 26 at the orifice. The hand manipulated actuator 28 is seated loosely within the orifice 67 in order that the hand manipulated actuator 28 is easily moveable.

Other modifications and alterations may be used in the design and manufacture of the drip cup of the present invention without departing from the spirit and scope of the accompanying claims.

What is claimed is:

1. An apparatus adapted for placement on the end of a spout to catch liquid dripping from said spout, comprising:

a vessel for containing said liquid, said vessel having an inner surface that defines an interior adapted to receive and retain a volume of liquid, and also having an opening into said interior at the top of said vessel for receiving said spout;

said vessel being generally elongated and having a central axis directed lengthwise within said vessel;

a handle attached to said vessel to allow for carrying and manipulation of said apparatus by one hand;

clamping means associated with said handle, said clamping means being located generally externally to said vessel;

said clamping means comprising a clamping pin, a hand manipulated actuator, and a biasing means;

wherein said handle aids in the manipulation of said actuator;

wherein said clamping pin has a first end and a second end, and is attached to said actuator at said second end, and moves in conjunction therewith and extends from said actuator to the interior of said vessel;

wherein said clamping pin and said actuator have a clamp position and a release position; and wherein said biasing means biases said clamping pin to said clamp position in order to retain said spout between said first end of said clamping pin and said inner surface of said vessel.

2. The apparatus of claim 1, wherein said clamping pin moves axially from said clamp position to said release position.

3. The apparatus of claim 2, wherein said clamping pin moves axially along an axis that is generally perpendicular to and passes through said central axis of said vessel.

4. The apparatus of claim 1, wherein said biasing means and said clamping pin are generally contained within a protective housing.

5. The apparatus of claim 1, also including a protective housing having a first and a second end, with said first end of said protective housing connected to said vessel at an aperture therein, with said clamping pin extending through said aperture into said vessel.

6. The apparatus of claim 5, wherein said clamping pin and said biasing means are retained within said protective housing and are precluded from exiting therefrom.

7. The apparatus of claim 6, wherein said protective housing has a stop ring located therein that precludes said biasing means from exiting therefrom.

8. The apparatus of claim 1, wherein said vessel is in the shape of a cylinder.

9. The apparatus of claim 1, wherein said liquid is a petroleum based fuel, a lubricant or a chemicals.

* * * * *